(12) United States Patent
Seo et al.

(10) Patent No.: US 11,297,235 B2
(45) Date of Patent: Apr. 5, 2022

(54) OPTICAL APPARATUS HAVING VIBRATION DEVICE

(71) Applicant: CANON KABUSHIKI KAISHA, Tokyo (JP)

(72) Inventors: Takazumi Seo, Tokyo (JP); Toshihiro Ogawa, Tokyo (JP); Kohei Uemura, Kanagawa (JP); Shinga Nakashima, Kanagawa (JP); Atsuto Noda, Tokyo (JP); Akira Watanabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/124,412

(22) Filed: Dec. 16, 2020

(65) Prior Publication Data

US 2021/0105391 A1 Apr. 8, 2021

Related U.S. Application Data

(63) Continuation of application No. PCT/JP2019/020715, filed on May 24, 2019.

(30) Foreign Application Priority Data

Jun. 18, 2018 (JP) .............................. JP2018-115616
Apr. 24, 2019 (JP) .............................. JP2019-083297

(51) Int. Cl.
*H04N 5/232* (2006.01)
*H04N 5/225* (2006.01)
*G02B 27/64* (2006.01)

(52) U.S. Cl.
CPC ......... *H04N 5/2328* (2013.01); *G02B 27/646* (2013.01); *H04N 5/2254* (2013.01); *H04N 5/23258* (2013.01); *H04N 5/23287* (2013.01)

(58) Field of Classification Search
CPC ........... H04N 5/23258; H04N 5/23287; H04N 5/2254; H04N 5/2328; G02B 27/646
See application file for complete search history.

(56) References Cited

U.S. PATENT DOCUMENTS 8,587,676 B2 * 11/2013 Kim ..................... H04N 5/2328
348/208.7
11,095,818 B2 * 8/2021 Tani ................... H04N 5/23287
(Continued)

FOREIGN PATENT DOCUMENTS

CN       105980921 A     9/2016
JP       2005-173038 A   6/2005
(Continued)

OTHER PUBLICATIONS

The above foreign document was cited in a Aug. 17, 2021 Chinese Office Action, with an English Translation, that issued in Chinese Patent Application No. 201980040640.6.
(Continued)

*Primary Examiner* — Nicholas G Giles
(74) *Attorney, Agent, or Firm* — Cowan, Liebowitz & Latman, P.C.

(57) ABSTRACT

An optical apparatus configured to correct an image blur by moving an image stabilization unit in a first direction different from an optical axis direction based on shake information obtained by a shake detector includes a vibration device configured to generate a vibration in order to transmit to a user a tactual sense according to an operation of an operation unit by the user. During an imaging and recording period, the vibration device generates the vibration having a vibration intensity in a second direction different from the first direction higher than that in the first direction.

14 Claims, 10 Drawing Sheets

(56) References Cited

U.S. PATENT DOCUMENTS

| | | | | |
|---|---|---|---|---|
| 2012/0162455 A1* | 6/2012 | Kim | ................... | H04N 5/2328 |
| | | | | 348/208.12 |
| 2014/0104453 A1* | 4/2014 | Fujinawa | ........... | H04N 5/23219 |
| | | | | 348/222.1 |
| 2020/0322517 A1* | 10/2020 | Tani | ..................... | G03B 17/38 |

FOREIGN PATENT DOCUMENTS

| | | | |
|---|---|---|---|
| JP | 2006-136865 A | 6/2006 |
| JP | 2013-070303 A | 4/2013 |
| JP | 2013-235614 A | 11/2013 |
| WO | 2015/122107 A1 | 8/2015 |
| WO | 2019/087504 A1 | 5/2019 |

OTHER PUBLICATIONS

The Foreign references 1 and 3-6 were cited in the International Search Report of the corresponding International Application, PCT/JP2019/020715 dated Aug. 6, 2019.

* cited by examiner

OPTICAL APPARATUS HAVING VIBRATION DEVICE

CROSS-REFERENCE TO RELATED APPLICATIONS

This application is a Continuation of International Patent Application No. PCT/JP2019/020715, filed on May 24, 2019, which claims the benefit of Japanese Patent Applications Nos. 2018-115616, filed on Jun. 18, 2018, and 2019-083297, filed on Apr. 24, 2019, each of which is hereby incorporated by reference herein in their entirety.

BACKGROUND OF THE INVENTION

Field of the Invention

The present invention an optical apparatus, such as a digital camera and an interchangeable lens, which has a vibration device.

Description of the Related Art

The optical apparatus described above often has a configuration for generating an operational sense such as a click sense in response to a user operation of an operation member such as a rotary ring, a dial, and a button. Japanese Patent Laid-Open No. ("JP") 2006-136865 discloses a configuration in which a vibration device (piezoelectric actuator) is disposed just below a button, and configured to vibrate in response to a user operation of the button to generate the operational sense.

However, when the optical apparatus or another optical apparatus attached to it has a shake sensor that detects camera shakes, such as manual shakes, for an image stabilization operation that reduces image blurs caused by camera shakes, the vibration from the vibration device may negatively affect the detection of camera shakes or the image stabilization operation. More specifically, when the vibration from the vibration device is detected by the shake sensor, the image stabilization operation is performed although no camera shakes occur or so as to reduce image blurs more than the actual image blurs caused by the camera shakes, rather causing the image blurs.

SUMMARY OF THE INVENTION

The present invention provides an optical apparatus that can reduce the influence of vibrations generated by the vibration device on a shake detection.

An optical apparatus according to one aspect of the present invention is configured to correct an image blur by moving an image stabilization unit in a first direction different from an optical axis direction based on shake information obtained by a shake detector, and includes a vibration device configured to generate a vibration in order to transmit to a user a tactual sense according to an operation of an operation unit by the user. During an imaging and recording period, the vibration device generates the vibration having a vibration intensity in a second direction different from the first direction higher than that in the first direction.

Further features of the present invention will become apparent from the following description of exemplary embodiments with reference to the attached drawings.

DESCRIPTION OF THE EMBODIMENTS

Figure 1A:
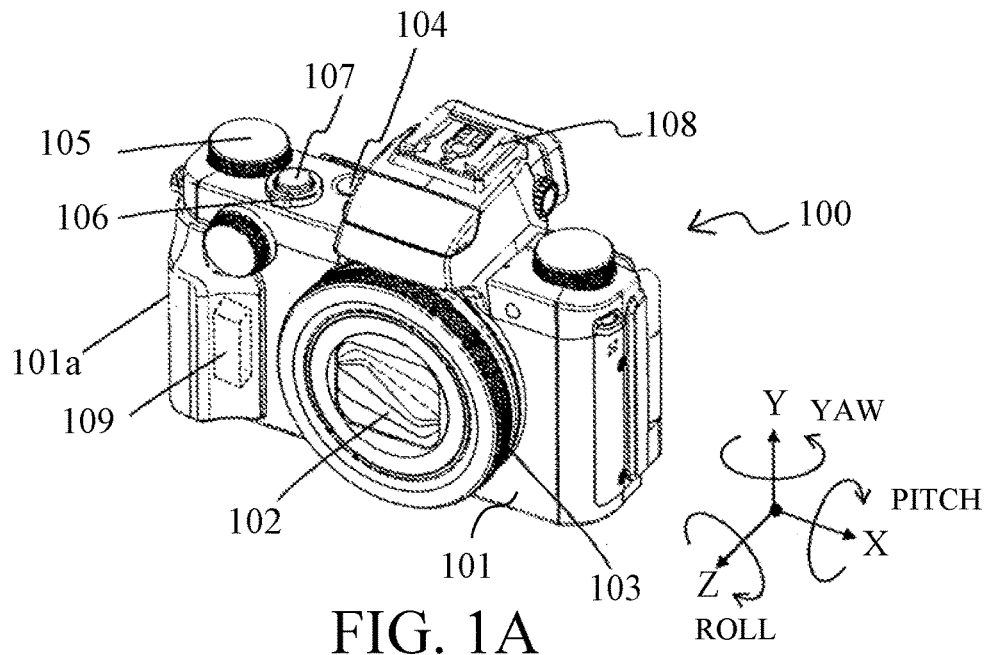
FIGS. 1A to 1C are front and rear perspective views of a digital camera according to a first embodiment of the present invention, and a diagram showing an internal structure of a vibration device.

Referring now to the drawings, a description will be given of embodiments according to the present invention.

First Embodiment

Figure 1B:
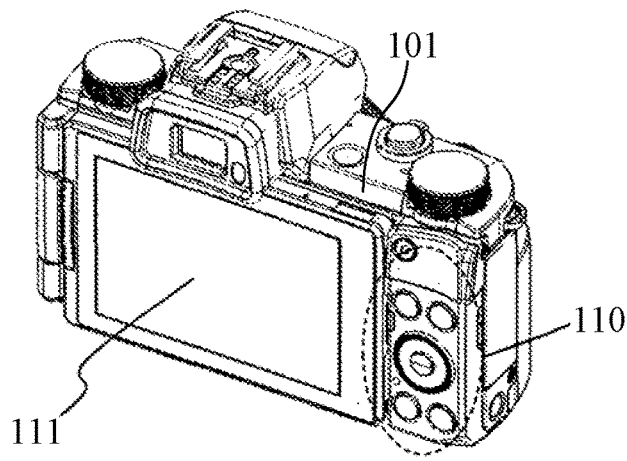

Referring now to FIGS. 1A and 1B, a description will be given of a configuration of a digital camera (referred to as a camera hereinafter) 100 as an image pickup apparatus (optical apparatus) according to a first embodiment of the present invention. As illustrated in FIG. 1A, a Z-axis direction is set to an optical axis direction in which an optical axis of a lens barrel unit (optical system) described later in the camera 100 extends, and an X-axis direction (horizontal direction) and a Y-axis direction (vertical direction) are set to directions orthogonal to the Z-axis direction. Hereinafter, the X-axis direction and the Y-axis direction will be collectively referred to as an X/Y-axis direction. Further, the rotating direction around the X-axis is set to a pitch direction, and a rotating direction around the Y-axis is set to a yaw direction. The pitch and yaw directions (collectively referred to as the pitch/yaw direction hereinafter) are rotating directions around two axes that are the X-axis and the Y-axis orthogonal to each other. Further, the rotating direction around the Z-axis is set to a roll direction.

FIG. 1A illustrates a front surface and a top surface of the camera 100. The camera 100 has a body 101 and a retractable lens barrel unit 102 provided at the center of the front surface of the body 101 and forms light from an object to form an object image. An image sensor (see FIG. 2) that photoelectrically converts (captures) an object image and generates an image is provided in the body 101.

A front grip part 101a for a user to grip the camera 100 with a hand is provided on the left side (right side when viewed from the rear) of the front surface of the body 101 when viewed from the front (object side). Further, a rotational operation ring (operation unit) 103 rotatable around the optical axis is provided on an outer circumference of the lens barrel unit 102. The user can assign an arbitrary function for changing an imaging condition to the rotational operation ring 103. For example, an imaging condition such as a focus position and an exposure value can be variably set by rotating the rotational operation ring 103.

A power button 104 and a mode dial 105 for switching the imaging mode are disposed on a top surface of the body 101. When the user presses the power button 104 while the camera 100 is powered off, the camera 100 is powered on. When the camera 100 is powered on, the lens barrel unit 102 projects forward from the retracted position and becomes ready for imaging. In this state, the user can select various imaging modes by rotating the mode dial 105. The various imaging modes include a manual still image capturing mode in which the user can arbitrarily set an imaging condition such as a shutter speed and an F-number (aperture value), an automatic still image capturing mode in which a proper exposure amount can be automatically obtained, and a motion image capturing mode, etc.

Further, disposed on the top surface of the body 101 are a zoom lever 106 operable by the user to the left and right to change a focal length of the lens barrel unit 102, and a release button 107 pressed by the user to instruct imaging. Further, provided on the top surface of the body 101 are an accessory shoe 108 to which an external flash unit, a microphone, or the like can be detachably attached.

When the user presses the power button 104 while the camera 100 is powered on, the lens barrel unit 102 is retracted in the body 101 and the camera 100 is powered off.

A vibration device 109 is attached to an inner surface of the front grip part 101a of the body 101. The vibration device 109 generates vibrations in response to a user operation of the operation unit such as the rotational operation ring 103, the power button 104, the mode dial 105, the zoom lever 106, and the release button 107, and gives the vibrations to the front grip part 101a. The vibration device 109 is, for example, a linear actuator (LRA) type or piezoelectric element type vibration device, and can variably set a vibration parameter such as a vibration intensity (amplitude) and a vibration frequency. Changing the vibration parameter can generate vibrations of various vibration patterns.

FIG. 1B illustrates a rear surface of the camera 100. Provided on the rear surface of the body 101 are a rear operation unit (operation unit) 110 and a display unit 111. When the camera 100 is powered on and the still or motion image capturing mode is set, the display unit 111 displays a through-image of the object image captured by the image sensor. Further, the display unit 111 displays imaging parameters indicating the imaging condition such as the shutter speed and the F-number, and the user can change the set value of the imaging parameter by operating the rear operation unit 110 while viewing the display. The rear operation unit 110 also includes a reproduction button for instructing a reproduction of a recorded captured image, and when the user operates the reproduction button, the captured image is reproduced and displayed on the display unit 111.

Figure 1C:
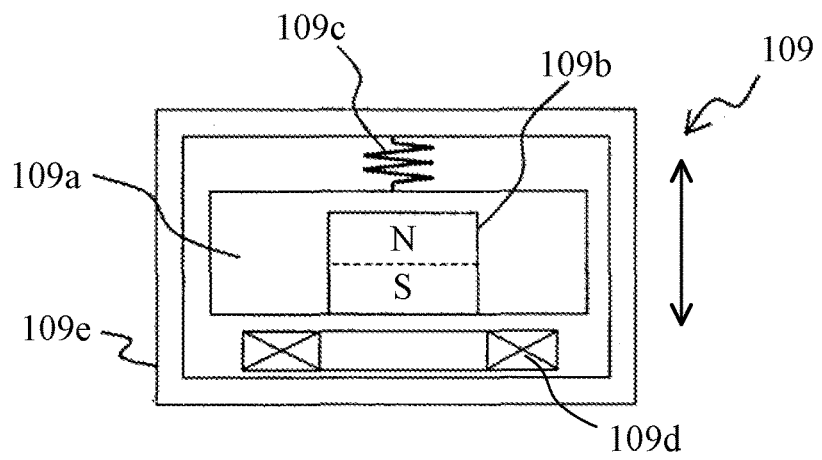

As an example of the vibration device attached to the front grip 101a, an LRA type vibration device will be described with reference to FIG. 1C. The LRA type vibration device 109 includes a vibrator 109a, a magnet 109b, a spring 109c, a coil 109d, and a base 109e. The vibrator 109a holds the magnet 109b and is movably connected to the base 109e by the spring 109c. The coil 109d is disposed near the magnet 109b and electrically connected to a circuit board (see FIG. 5). The coil 109d generates an electromagnetic force when supplied with the current from the circuit board, and the vibrator 109a reciprocates due to the electromagnetic force and the attractive force or repulsive force with the magnet 109b, which causes the vibration device 109 to vibrate in the arrow direction in the figure.

Figure 2:
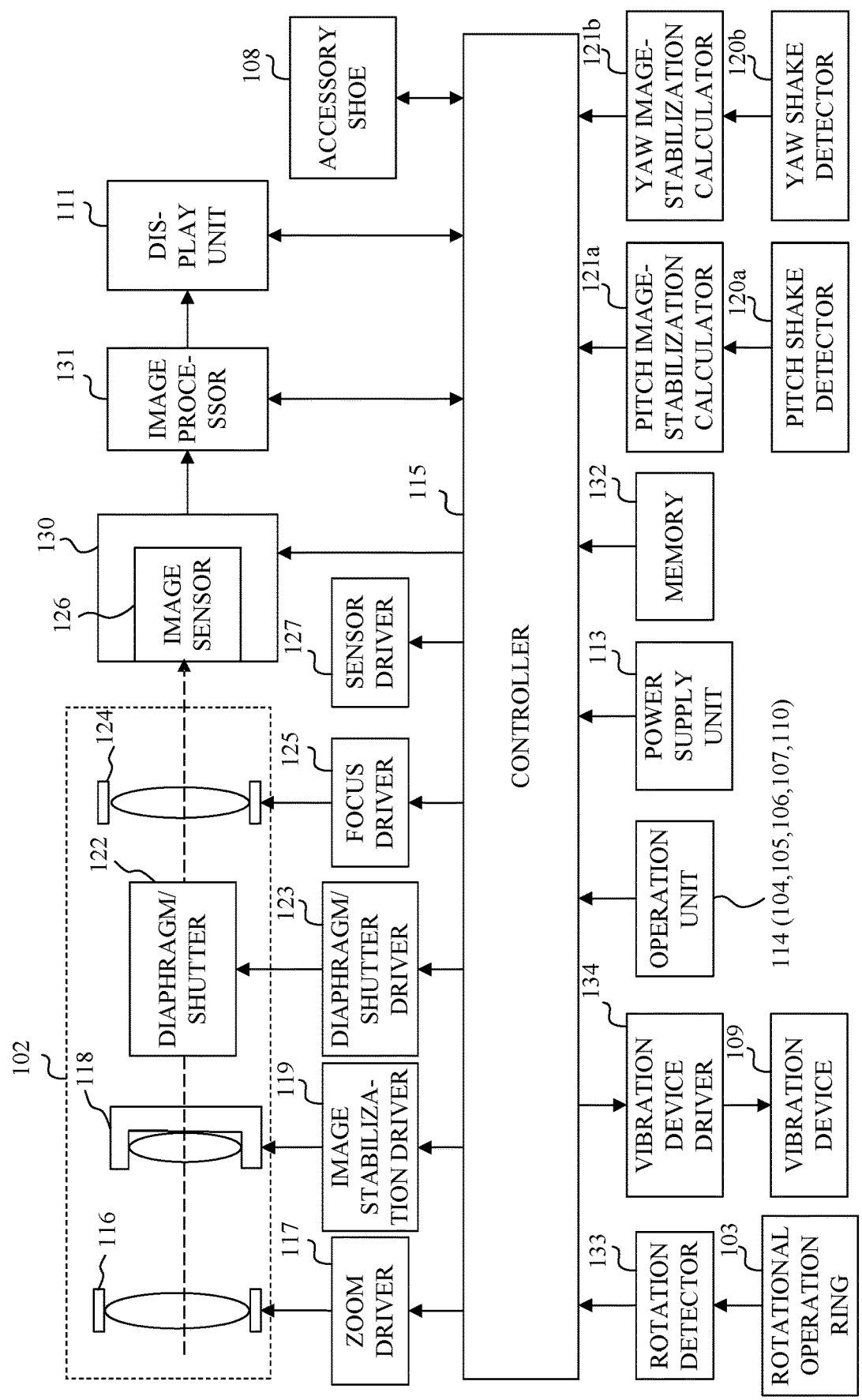
FIG. 2 is a block diagram showing a configuration of the camera according to the first embodiment.

FIG. 2 illustrates an electrical and optical configuration of the camera 100. The camera 100 includes a power supply unit 113 that supplies power to each component described later, and an operation unit 114 including the power button 104, the mode dial 105, the zoom lever 106, the release button 107, and the rear operation unit 110. The camera 100 is entirely controlled by a controller 115. The controller 115 controls the entire camera 100 by reading and executing a control program stored in an unillustrated memory.

The lens barrel unit 102 includes a zoom unit 116 that includes a zoom lens that moves in the optical axis direction for magnification varying, and a lens image-stabilization unit (first image stabilization unit) 118 that includes a shift lens (optical element) that serves as an image stabilization element that reduces (corrects) image blurs. The lens image-stabilization unit 118 moves (shifts) the shift lens in the X/Y-axis direction orthogonal to the optical axis for the image stabilization operation that reduces image blurs. The lens barrel unit 102 also includes a diaphragm (aperture stop)/shutter unit 122 that performs a light amount adjustment operation and a shutter operation, and a focus unit 124 that includes a focus lens that moves in the optical axis direction for focusing.

The camera 100 includes a zoom driver 117 that drives the zoom unit 116 to move the zoom lens, an image stabilization driver 119 that drives the lens image-stabilization unit 118 to shift the shift lens, and a diaphragm/shutter driver 123 that drives the aperture/shutter unit 122. The camera 100 further includes a focus driver 125 that drives the focus unit 124 to move the focus lens.

When a magnification varying instruction is input from the operation unit 114, the controller 115 controls driving of the zoom unit 116 via the zoom driver 117 so as to instruct magnification varying. The controller 115 also controls diaphragm driving of the aperture/shutter unit 122 via the diaphragm/shutter driver 123 according to the F-number or the shutter speed setting value received from the operation unit 114 or the brightness signal obtained from an image processor 131. In addition, the controller 115 controls shutter driving of the aperture/shutter unit 122 via the diaphragm/shutter driver 123 according to the imaging instruction operation through the release button 107. Further, the controller 115 controls driving of the focus unit 124 via the focus driver 125 according to the focus signal acquired from the image processor 131 for autofocusing.

The image sensor 126 photoelectrically converts the object image and outputs an imaging signal. The image processor 131 performs various image processing for the imaging signal and generates an image signal. The display unit 111 displays the image signal (through-image) output from the image processor 131, displays the imaging parameters as described above, and reproduces and displays the captured image recorded in a memory 132.

The image sensor 126 is included in the sensor image-stabilization unit (second image stabilization unit) 130 as an image stabilization element. The sensor image-stabilization unit 130 performs the image stabilization operation that reduces (corrects) image blurs by moving (shifting) the image sensor 126 in the X/Y-axis direction orthogonal to the optical axis. The controller 115 controls imaging by the image sensor 126 and driving of the sensor image-stabilization unit 130 (shift position of the image sensor 126) via a sensor driver 127. The image blurs in the roll direction may be reduced by rotating the image sensor 126 in the XY plane.

The camera 100 has a pitch shake detector 120*a* and a yaw shake detector 120*b* as shake detectors capable of detecting shakes such as manual shakes (referred to as camera shakes hereinafter) applied to the camera 100. The pitch shake detector 120*a* and the yaw shake detector 120*b* respectively use an angular velocity sensor (vibration gyro) and an angular acceleration sensor, detect the camera shakes in the pitch direction (rotating direction around the X-axis) and the yaw direction (rotating direction around the Y-axis), and output shake signals.

A pitch image stabilization calculator 121*a* calculates shift positions in the Y-axis direction of the lens image-stabilization unit 118 (shift lens) and the sensor image-stabilization unit 130 (image sensor 126) using the shake signal from the pitch shake detector 120*a*. Further, a yaw image stabilization calculator 121*b* calculates shift positions in the X-axis direction of the lens image-stabilization unit 118 and the sensor image-stabilization unit 130 using the shake signal from the yaw shake detector 120*b*. The controller 115 controls the shift positions of the lens image-stabilization unit 118 and the sensor image-stabilization unit 130 via the image stabilization driver 119 and the sensor driver 127 in accordance with the shift positions in the pitch/yaw direction calculated by the pitch image stabilization calculator 121*a* and the yaw image stabilization calculator 121*b*. Thereby, the image stabilization operation for correcting the image blurs is performed.

The user can select through the operation unit 114 whether the image stabilization operation is performed by driving one or both of the lens image-stabilization unit 118 and the sensor image-stabilization unit 130. For example, when the user has set the image stabilization operation, the controller 115 determines the imaging scene, selects the optimal one or both of the lens image-stabilization unit 118 and the sensor image-stabilization unit 130, and provides the image stabilization operation.

When the user turns off the driving setting of the image stabilization unit (non-driving state of image stabilization operation) and turns on the drive setting of the vibration device (driving state of generating vibrations) and the vibration device 109 vibrates, the vibration is transmitted to the image stabilization unit through the structure such as the body 101. As a result, the shift lens and the image sensor may shake and cause image blurs. Therefore, in such a case, the controller 115 may automatically turn on at least one of the image stabilization units (driving state). At this time, for example, the lens image-stabilization unit 118, which consumes less driving power (power consumption) than the sensor image-stabilization unit 130, may be turned on. Thereby, the image blurs caused by the vibrations from the vibration device 109 can be suppressed while the power consumption is suppressed.

The image blurs in the roll direction may be reduced by rotating the image sensor 126 in the XY plane.

A rotation detector 133 detects the rotational operation of the rotational operation ring 103. When the rotation detector 133 detects the rotational operation, the controller 115 outputs a driving signal to the vibration device 109 via a vibration device driver 134 to cause the vibration device 109 to vibrate. The controller 115 also causes the vibration device 109 to vibrate when the operation unit 114 is operated. When the vibration device 109 vibrates the front grip part 101*a* illustrated in FIG. 1A, the user who holds the front grip part 101*a* can feel a click sense for the rotational operation of the rotational operation ring 103 and an operation sense for the operation of the operation portion 114.

As described above, the setting value of the imaging parameter can be changed by operating the rear operation unit 110, but it is also possible to assign the change of the setting value of the imaging parameter to the rotational operation of the rotational operation ring 103.

Figure 9:
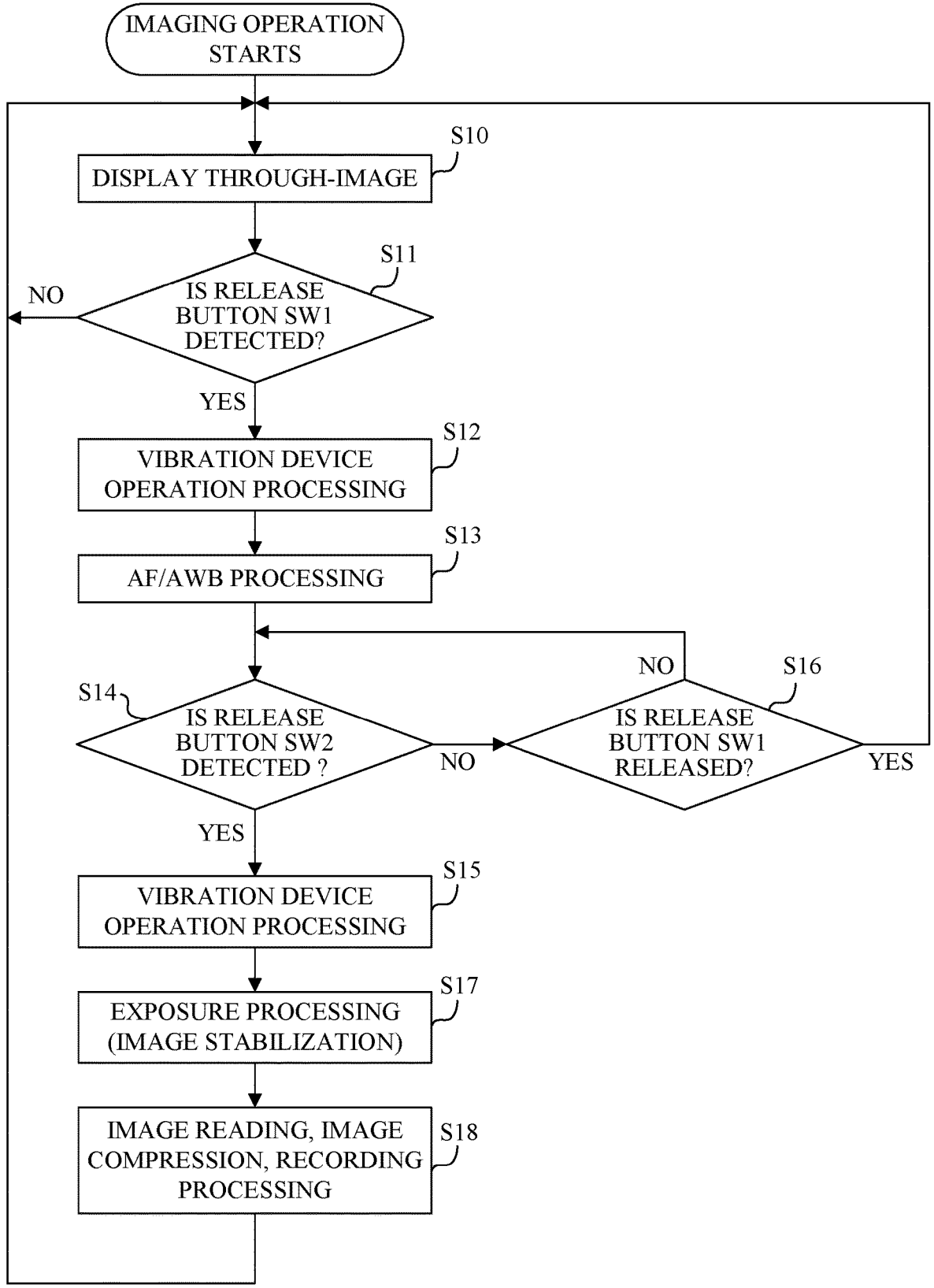
FIG. 9 is a flowchart showing processing performed by the camera according to the first embodiment.

A flowchart of FIG. 9 shows processing (operation) performed by the controller 115 when the camera 100 illustrated in FIG. 2 captures an image. A description will now be given of processing when the camera 100 captures a still image as an example. The controller 115 as a computer executes this processing according to a control program (computer program).

When the user presses the power button 104 to turn on the main power of the camera 100, the controller 115 starts the imaging operation and displaying a through-image on the display unit 111 in the step S10.

Next, in the step S11, the controller 115 checks, based on the signal from the operation unit 114, whether or not the half-press operation (SW1) of the release button 107 is detected. The controller 115 proceeds to the step S12 when detecting the half-press operation (SW1) of the release button 107, or otherwise returns to the step S10.

In the step S12, the controller 115 starts the vibration device operation processing and feeds back the tactual sense of the half-press operation to the user.

Next, in the step S13, the controller 115 performs auto-focus (AF) processing, auto-exposure adjustment (AE), and automatic white balance (AWB) control processing at the focal length corresponding to the position (zoom position) of the zoom lens selected at that time.

Next, in the step S14, the controller 115 checks, based on the signal from the operation unit 114, whether or not the full-press operation (SW2) of the release button 107 has been detected. The controller 115 proceeds to the step S15 when detecting the full-press operation (SW2) of the release button 107, or otherwise proceeds to the step S16.

In the step S16, the controller 115 checks, based on the signal from the operation unit 114, whether or not the release of the half-push operation (SW1) of the release button has been detected. The controller 115 returns to the step S10 when detecting release of the half-press operation (SW1) of the release button, or otherwise returns to the step S14.

In the step S15, the controller 115 starts the vibration device operation processing and feeds back the tactual sense of the full-press operation to the user.

Next, in the step S17, the controller 115 starts the exposure processing together with the image stabilization operation. Then, in the step S18, the controller 115 causes the image processor 131 to acquire an image signal used to generate a still image from the image sensor 126, and the still image data generated from the image signal is stored in the memory 132 such as a semiconductor memory. In this way, the one-frame still image capturing processing is completed, and the flow returns to the step S10.

Figure 10:
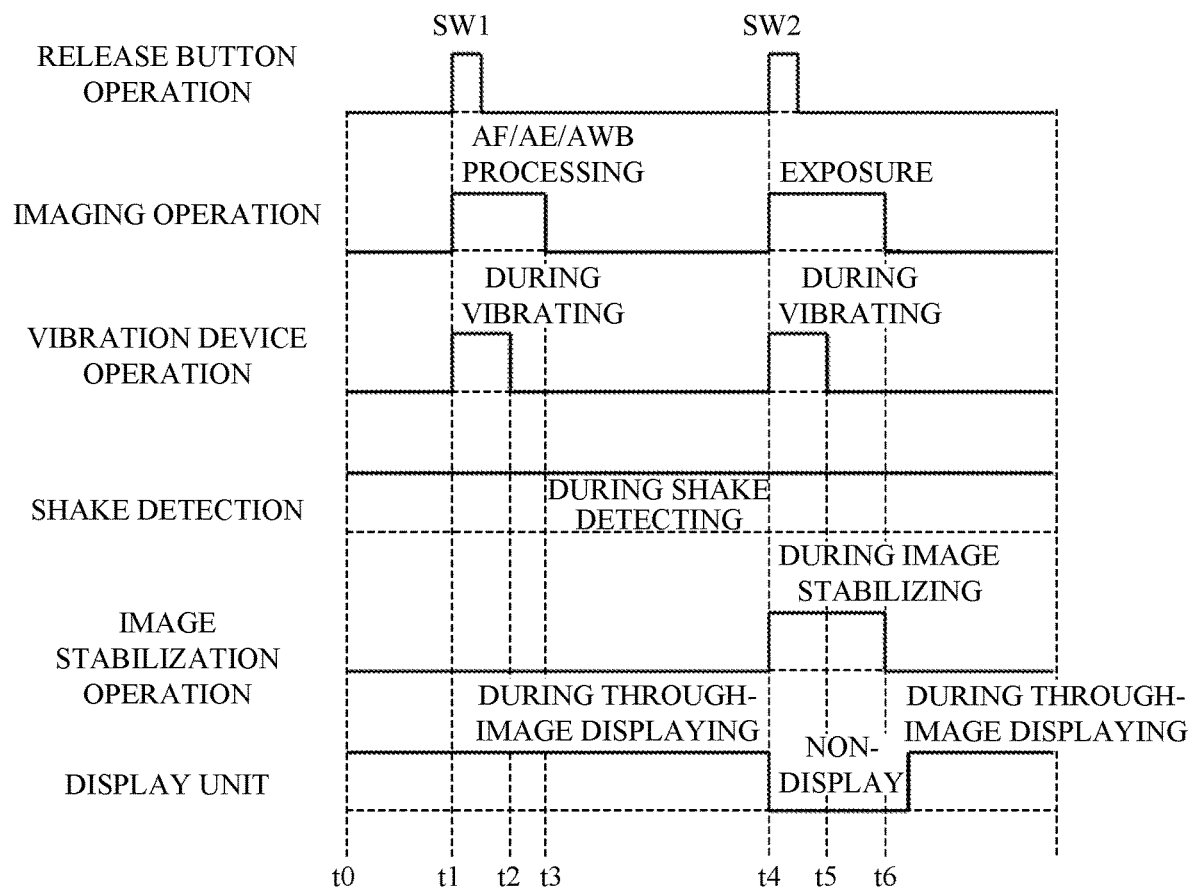
FIG. 10 is a timing chart showing the progress of the processing illustrated in FIG. 9.

FIG. 10 is a timing chart showing the progress of the processing illustrated in FIG. 9. In FIG. 10, a through-view image is displayed on the display unit 111 between time t0 and time t4. The pitch-direction shake detector 120*a* and the yaw-direction shake detector 120*b* always detect the shakes of the camera 100.

Next, at time t1, the controller 115 starts the vibration device operation processing in response to the user's half-pressing operation of the release button 107 (SW1), and sends a driving signal to the vibration device 109. The vibration device 109 vibrates in response to the driving signal during the period from time t1 to time t2, and feeds back the tactual sense of the half-press operation to the user. Just after the driving signal is sent to the vibration device 109, the controller 115 executes the AF, AE, and AWB processing during a period from time t1 to time 3.

Next, at time 12, when the user fully presses the release button 107 (SW2), the controller 115 starts the vibration device operation processing, and sends a driving signal to the vibration device 109. The vibration device vibrates in the period from time t4 to time t5 in response to the driving signal and feeds back the tactual sense of the full-press operation to the user. During a period from time t4 to time t6 just after the driving signal is sent to the vibration device 109, the controller 115 drives the lens image-stabilization unit 118 and the sensor image-stabilization unit 130 based on the shake signals detected by the pitch-direction shake detector 120a and the yaw-direction shake detector 120b, and causes the image sensor 126 to execute exposure processing.

In the timing chart illustrated in FIG. 10, the vibration generation period (t1 to t2) of the vibration device 109 according to the SW detection overlaps the through-image display period of the display unit. In other words, when the vibration device 109 is driven to generate vibrations and the vibrations negatively affect the lens image-stabilization unit 118 or the sensor image-stabilization unit 130, the through-image is also negatively affected.

The vibration generation period (t4 to t5) of the vibration device 109 according to the SW2 detection overlaps the shake signal detection period in which the image stabilization is performed and the exposure period (t4 to t6) associated with the image stabilization. In other words, when the vibration device 109 is driven to generate vibrations, if the pitch-direction shake detector 120a, the yaw-direction shake detector 120b, the lens image-stabilization unit 118, and the sensor image-stabilization unit 130 are negatively affected, the image stabilization result is also negatively affected. Therefore, the vibration device 109 minimizes the influence on the pitch-direction shake detector 120a, the yaw-direction shake detector 120b, the lens image-stabilization unit 118, and the sensor image-stabilization unit 130 in consideration of the vibration direction of the vibrations generated from the vibration device 109.

Figure 3:
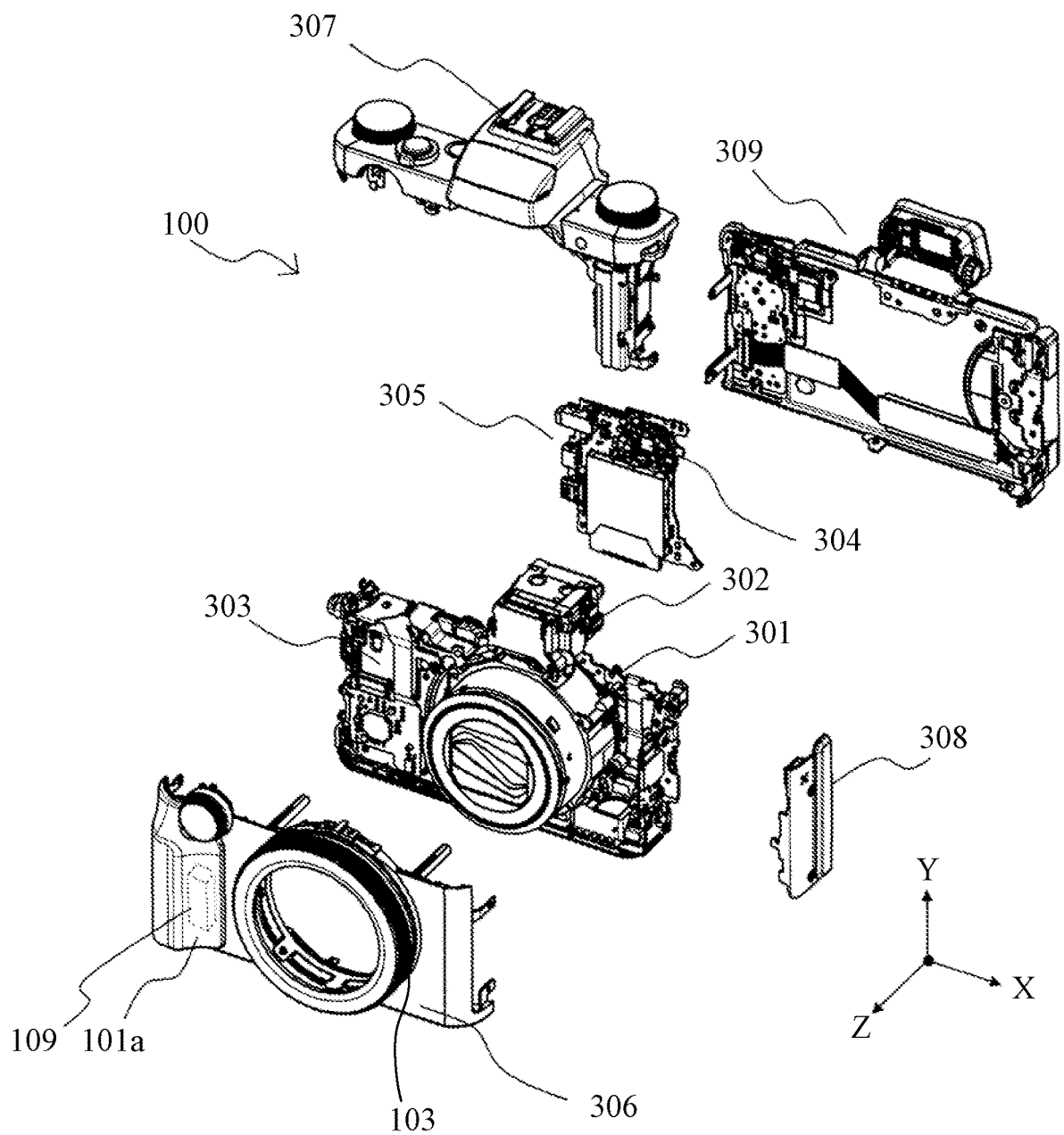
FIG. 3 is an exploded perspective view of the camera according to the first embodiment.

FIG. 3 illustrates the camera 100 in an exploded state. The lens barrel unit 102, a viewfinder display unit 302, and a battery storage 303 are attached to a main chassis 301 that is a housing. Further, an electronic circuit board 305 mounted with a shake detector 304 including the pitch shake detector 120a and the yaw shake detector 120b illustrated in FIG. 2 is attached to the main chassis 301.

A front cover unit 306, a top cover unit 307, a side cover unit 308, and a rear cover unit 309, which form the body (external member) 101 illustrated in FIG. 1A, are attached to the thus assembled main chassis 301. At this time, the lens barrel unit 102 is inserted into a circular opening formed in the front cover unit 306.

Further, the shake detector 304 mounted on the electronic circuit board 305 is located in an area (of the back projected plane of the front grip part 101a) overlapping the front grip part 101a provided on the front cover unit 306 when viewed from the front (object side) in the optical axis direction.

Figure 4A:
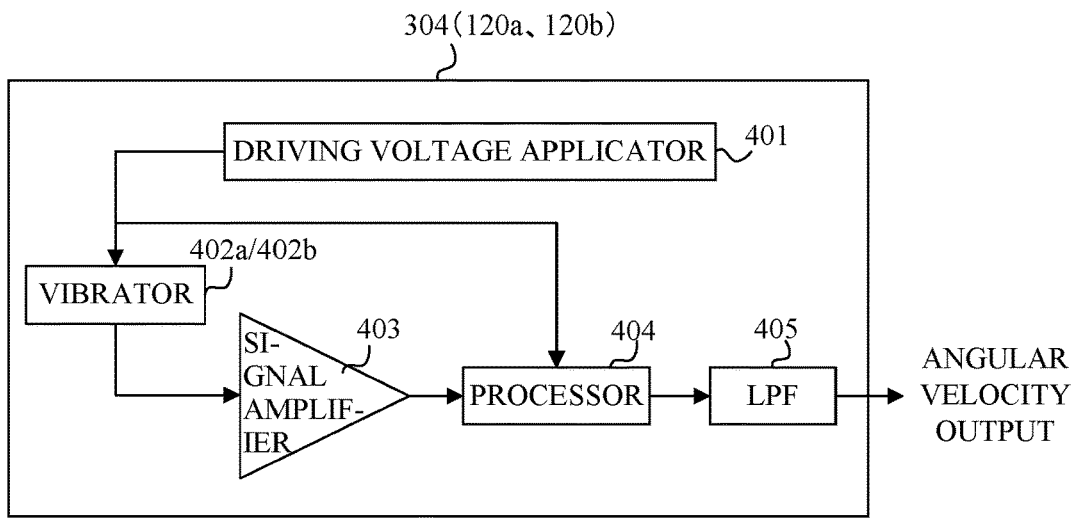
FIGS. 4A to 4C are diagrams illustrating a shake detector in the camera according to the first embodiment.

FIG. 4A illustrates a configuration of an angular velocity sensor used as the pitch shake detector 120a and the yaw shake detector 120b in the shake detector 304. A driving voltage applicator 401 applies a voltage to a vibrator 402 to vibrate the vibrator 402 at a predetermined frequency. When the vibrator 402 receives an angular velocity, a Coriolis force is generated in the vibrator 402. This Coriolis force is amplified by the signal amplification unit 403, and its output is converted into a DC voltage proportional to the angular velocity by the processor 404. More specifically, synchronous detection processing of the driving frequency of the oscillator 402 and the Coriolis force is performed, a signal in which a voltage proportional to the generated angular velocity and the drive frequency are superimposed is generated and smoothed by a LPF 405, and thereby the DC voltage proportional to the angular velocity is obtained.

Figure 4B:
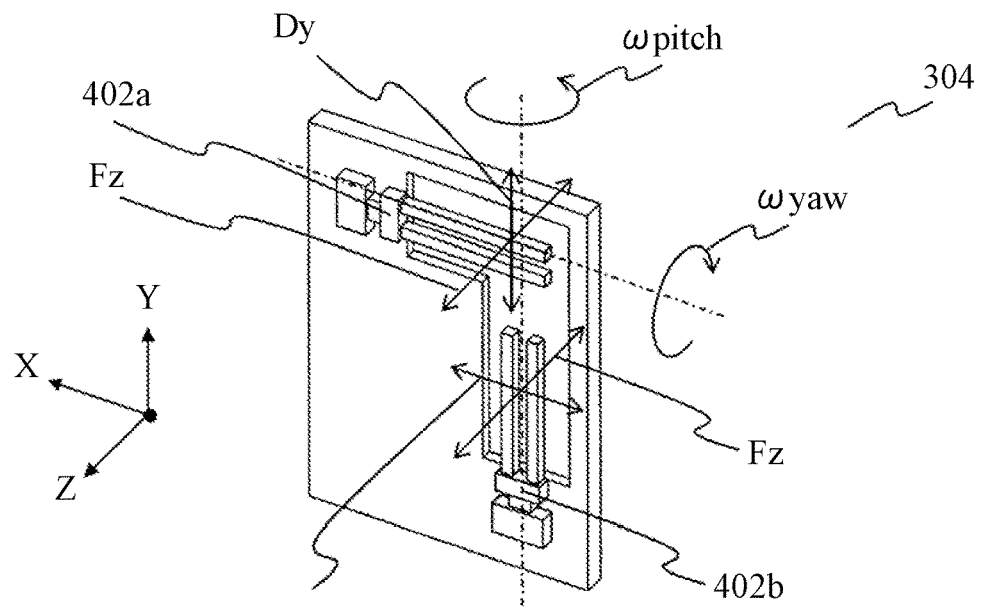

FIG. 4B illustrates a relationship among the vibration direction of the vibrator 402 of the angular velocity sensor illustrated in FIG. 4A, the angular velocity generating direction, and the Coriolis force generating direction. The vibrator 402a is provided to detect the angular velocity in the pitch direction, and the vibrator 402b is provided to detect the angular velocity in the yaw direction. The vibrators 402a and 402b are tuning-fork type oscillators.

When the vibrator 402a vibrating at a predetermined frequency in the Y-axis direction (Dy) rotates in the pitch direction around the X-axis at an angular velocity ωpitch, a Coriolis force in the Fz direction is generated in the vibrator 402a. Similarly, when the vibrator 402b vibrating at a predetermined frequency in the X-axis direction (Dx) rotates in the yaw direction around the Y-axis at an angular velocity ωyaw, a Coriolis force in the Fz direction is generated in the vibrator 402b. The angular velocity can be detected by detecting the Coriolis force generated in each vibrator and by performing the signal processing described above. Although FIG. 4B illustrates a tuning-fork type vibrator, another vibrator such as a comb tooth type may be used.

Figure 4C:
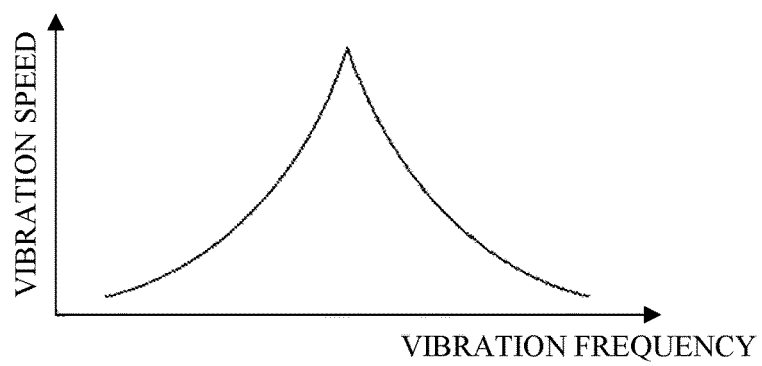

FIG. 4C illustrates a relationship between the vibration frequency and the vibration speed of the vibrators (402a, 402b). As illustrated in the figure, the driving speed of the vibrator changes according to the vibration frequency of the vibrator. This means that when the vibration state of the vibrator changes, the output sensitivity of the angular velocity sensor changes. That is, in order to stabilize the output sensitivity of the angular velocity sensor, it is necessary to keep the vibration frequency of the vibrator constant. In other words, when the vibration in the same or almost the same direction as the vibration direction of the vibrator propagates from the outside to the vibrator, the vibration state of the vibrator changes and it becomes impossible to detect the correct angular velocity (camera shakes).

Figure 5:
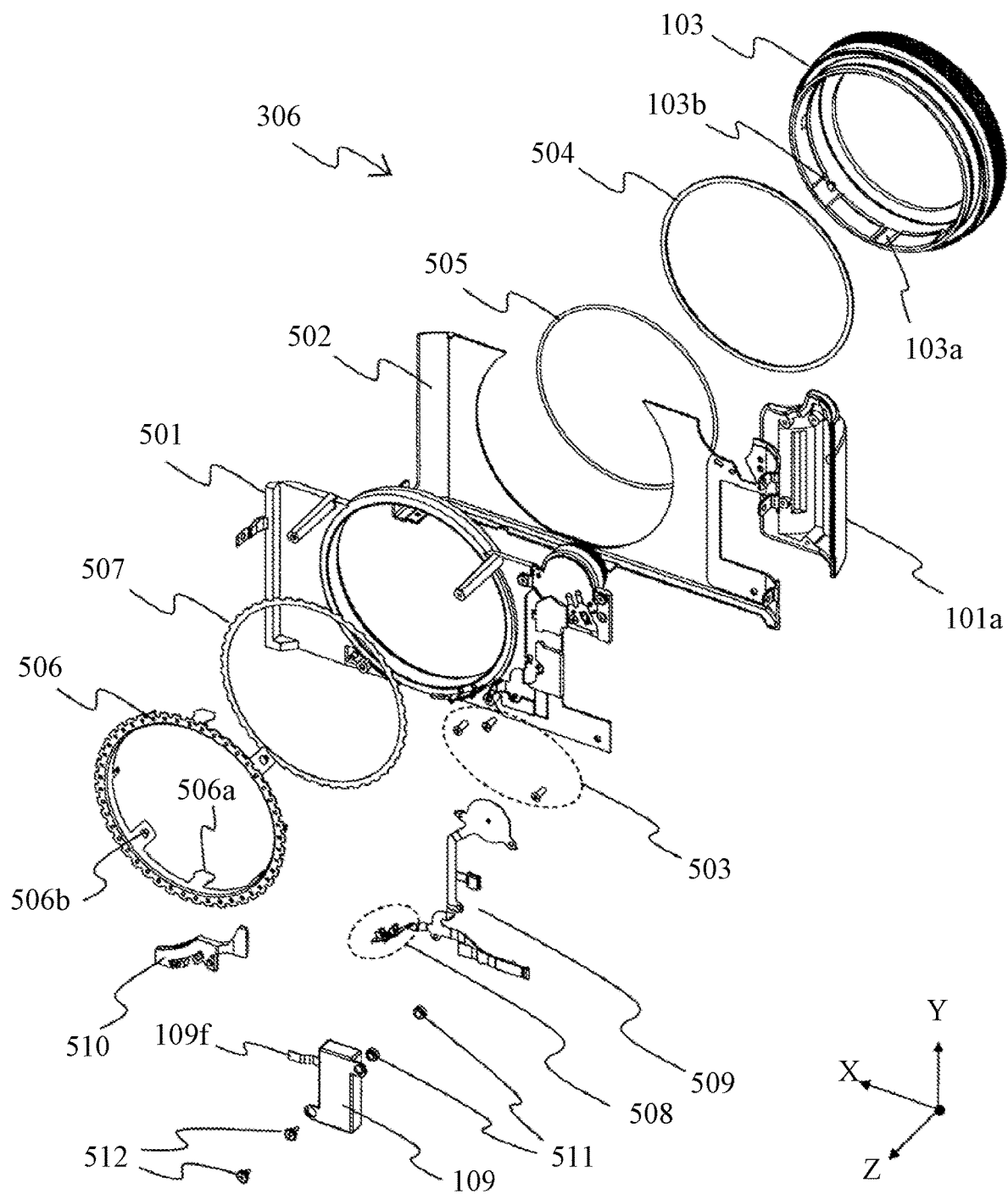
FIG. 5 is an exploded perspective view of a front cover unit in the camera according to the first embodiment.

FIG. 5 illustrates the front cover unit 306 in an exploded manner. The front cover unit 306 has a front base member 501, and the front cover 502, which is a metal exterior cover, is fixed to the front base member 501 with a double-sided tape or an adhesive material. The front grip part 101a is assembled to the front cover 502 from the outside, and is fixed with screws 503 from the inside. The front grip part 101a has a two-layer structure including a resin member on the front base member 501 side and an elastic member on the front surface side gripped by the user.

A front surface of a biasing ring 504 is attached with a double-sided tape to a front end surface in the groove extending in the circumferential direction of the rotational operation ring 103. The biasing ring 504 includes an elastic member and has a cushioning property. A rear surface of the urging ring 504 includes a seat for improving a slidability. An O-ring 505 is fitted into the groove from the rear of the biasing ring 504. The O-ring 505 is made of a rubber material such as fluororubber having a good slidability. The rotational operation ring 103 in which the biasing ring 504 and the O-ring 505 are assembled in this way is assembled to the front base member 501 from the front.

On the other hand, a sliding sheet 507 is attached to a front surface of a rotation detecting ring 506. The rotation detecting ring 506 has a plurality of concaves and convexes alternated at regular intervals in the circumferential direction. These convexes move in and out between a light emitter and a light receiver of a photo-interrupter 508 as the rotation detecting ring 506 rotates.

The rotation detecting ring 506 is assembled to the front base member 501 from the back. At this time, the rotating position of the rotation detecting ring 506 is determined so that phasing parts 506a provided at a plurality of circumferential positions (two locations in this embodiment) of the rotation detecting ring 506 match phasing concaves 103a provided at a plurality of circumferential positions on the inner circumferential part of the rotational operation ring 103. Hooking parts 506b formed so as to extend forward from a plurality of circumferential positions (four locations in this embodiment) of the rotation detecting ring 506 are engaged with projections 103b provided at a plurality of circumferential directions of the rotational operation ring 103. In this way, the rotational operation ring 103 and the rotation detecting ring 506 are connected so that they can integrally rotate.

The photo-interrupter 508 described above is mounted on a flexible circuit board 509. The flexible circuit board 509 is assembled to the front base member 501. The photo-interrupter 508 is in a light blocking state when the convex of the rotation detecting ring 506 is located between the light emitter and the light receiver, and in a light receiving state when the convex of the rotation detecting ring 506 is not located between the light emitter and the light receiver. A rotation and a rotating amount of the rotation detecting ring 506 or the rotational operation ring 103 can be detected by detecting and counting the number of switches between the light blocking state and the light receiving state.

Further, a holding member 510 is attached to the front base member 501. An arm part of the holding member 510 fixes the flexible circuit board 509 by pressing the rear surface of the flexible circuit board 509 mounted with the photo-interrupter 508.

The vibration device 109 is attached to the rear surface of the front grip part 101a with two screws 512. An electrode 109f of the vibration device 109 is connected to the flexible circuit board 509 assembled to the front base member 501.

The vibration device 109 is disposed so as to generate the vibration mainly in the optical axis direction (Z-axis direction) for the front grip part 101a. The user holds the front grip 101a and uses the camera 100. Hence, by disposing the vibration device 109 on the rear surface of the front grip part 101a, not only the vibration from the vibration device 109 is easily transmitted to the user's hand, but also the vibration from the vibration device 109 is unlikely to cause the manual shakes.

The optical axis direction (second direction), which is the main vibration generating direction of the vibration device 109, is orthogonal to the pitch/yaw direction and the vibration directions (third direction: referred to as vibrator vibrating directions hereinafter) Dx and Dy of the vibrators 402a and 402b. The main vibration generating direction of the vibration device 109 is orthogonal to the X/Y-axis direction (first direction) that is the shift driving direction of each of the lens image-stabilization unit 118 and the sensor image-stabilization unit 130 or the two axes orthogonal to each other.

However, the vibration device 109 may cause some vibrations also in the vibrator vibrating directions Dx and Dy and the shift driving directions, which are directions other than the main vibrating direction described above. Even in this case, the vibration generated by the vibration device 109 may have a vibration intensity (amplitude) in the main vibration generating direction (second direction) larger than the vibration intensity in the vibrator vibrating directions Dx and Dy and the shift driving directions (X/Y-axis direction).

An elastic member 511 disposed around the screws 512 is sandwiched between the vibration device 109 and the front grip part 101a. As will be described later in detail, the elastic member 511 has a characteristic of efficiently transmitting the vibration generated by the vibration device 109 to the front grip part 101a in the optical axis direction, and of damping vibrations in the other directions.

By disposing the vibration device 109 in this way, even if the vibration device 109 vibrates in various vibration patterns, the negative influence can be minimized on camera shake detection by the shake detector 304 and the image stabilization operations by the lens image-stabilization unit 118 and the sensor image-stabilization unit 130.

Figure 6A:
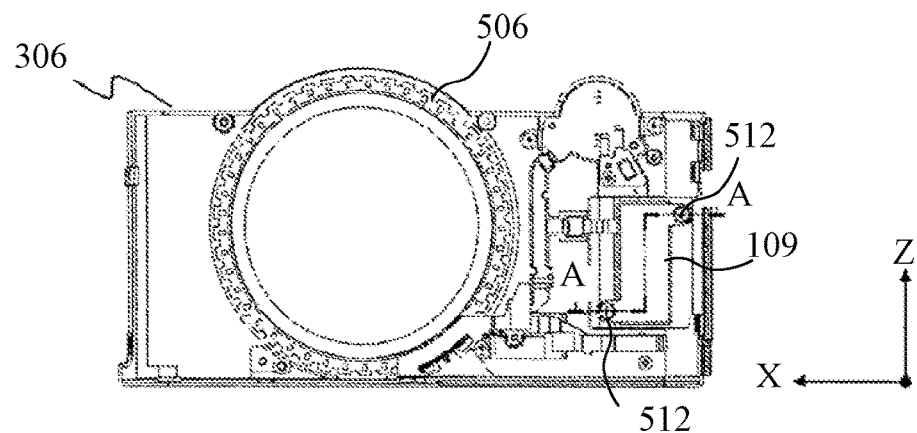
FIGS. 6A and 6B are diagrams showing a holding structure of a vibration device in the camera according to the first embodiment.
Figure 6B:
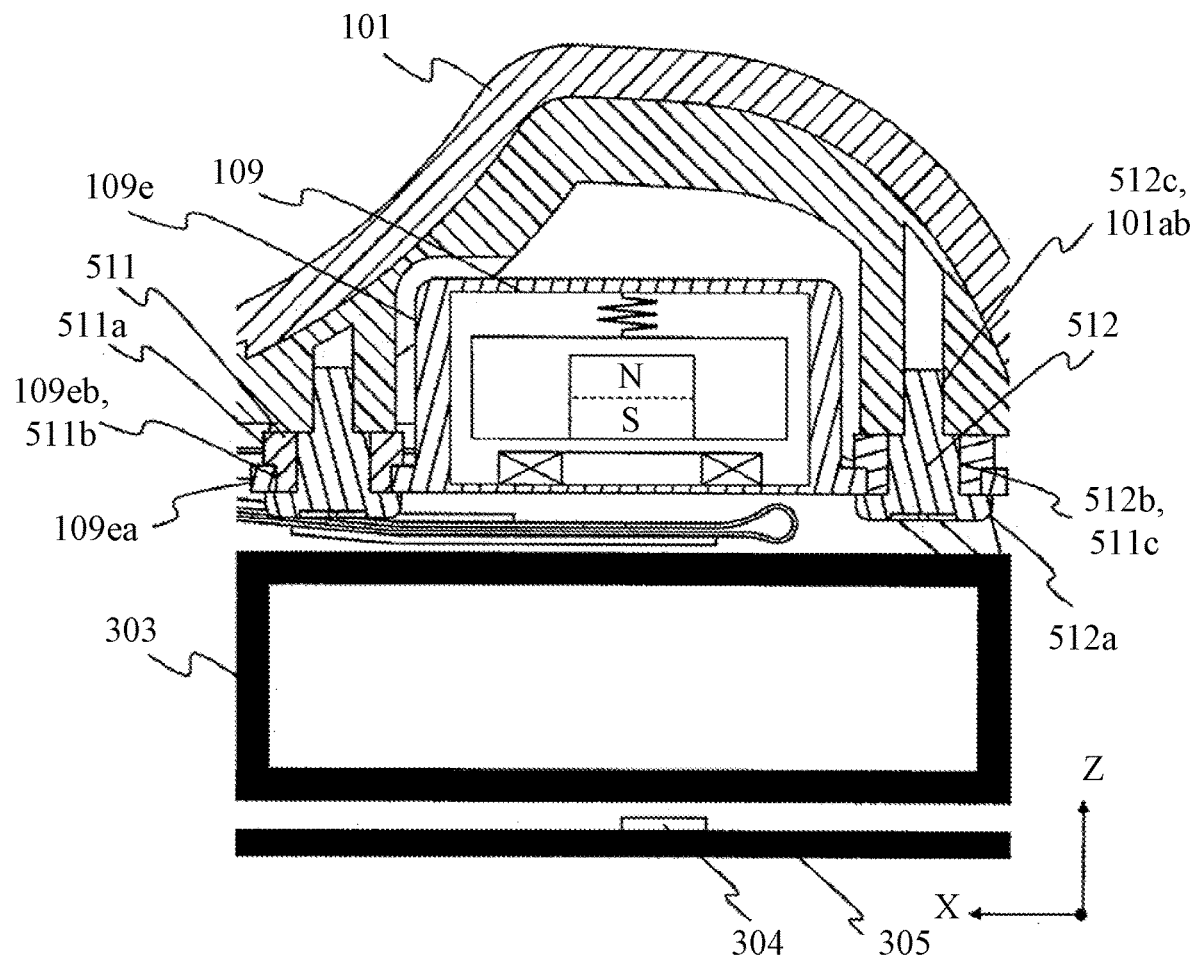

FIG. 6A is a rear view of the front cover unit 306 in which the vibration device 109 and the rotation detecting ring 506 are assembled. FIG. 6B is an enlarged cross-sectional view taken along a line A-A in FIG. 6A. The line A-A passes through the centers of the two screws 512 that attach the vibration device 109 to the front grip part 101a. FIG. 6B illustrates the electronic circuit board 305 (shake detector 304) disposed on the rear projected plane of the front grip part 101a as described above and the battery storage 303 disposed between the electronic circuit board 305 and the vibration device 109.

Flange portions 109ea are formed at two locations on the base 109e, which is a case of the vibration device 109, and fitting hole portions 109eb are formed in the flange portions 109ea. The elastic member 511 is a cylindrical member having a large diameter portion 511a and a small diameter portion 511b in the optical axis direction, which is made of a material such as an elastomer (rubber member) which has a large elastic deformation characteristic with a small force. The small diameter portion 511b of the elastic member 511 is fitted into the fitting hole portion 109eb of the flange portion 109ea. At this time, the outer circumferential surface of the small diameter portion 511b contact the overall inner circumferential surface of the fitting hole portion 109eb. Thereby, it is positioned relative to the base 109e in the direction orthogonal to the optical axis direction. Thereby, the elastic member 511 vibrates in the vibration directions Dx and Dy of the vibrators 402a and 402b and the X/Y-axis direction that are directions orthogonal to the optical axis direction that is the main vibration generating direction of the vibration device 10.

A head portion 512a, a cylindrical portion 512b, and a thread portion 512c are formed on the screw 512 in this order in the optical axis direction. While the small diameter portion 511b of the elastic member 511 is fitted in the fitting hole portion 109eb of the vibration device 109, the cylindrical portion 512b of the screw 512 is fitted into the hole portion 511c formed so as to penetrate the elastic member 511 in the optical axis direction. Then, the thread portion 512c of the screw 512 is fastened to a screw seat 101ab formed on the front grip part 101a. Thus, the vibration device 10 is positioned in the vibration generating direction while sandwiched between the head portion 512a of the screw 512 and the large diameter portion 511a of the elastic member 511.

When the vibration device 109 vibrates in the optical axis direction, the flange portion 109ea of the vibration device 109 and the head portion 512a of the screw 512 come into contact with each other, so that the vibration in the optical axis direction is efficiently transmitted to the front grip part 101a.

The electronic circuit board 305 is positioned and fixed relative to the battery storage 303. The shake detector 304 mounted on the electronic circuit board 305 is disposed in an area overlapping the vibration device 109 (in a projected plane of the vibration device 109) when viewed from the front (top side of FIG. 6B). Thereby, the influence of the vibration of the vibration device 109 on the shake detector 304 can be further reduced.

Second Embodiment

Next follows a description of a second embodiment according to the present invention. This embodiment will describe an interchangeable lens type digital camera (referred to as camera hereinafter) 1000 as an image pickup apparatus (optical apparatus) to which an interchangeable lens (other optical apparatus) 1002 can be attached.

Figure 7A:
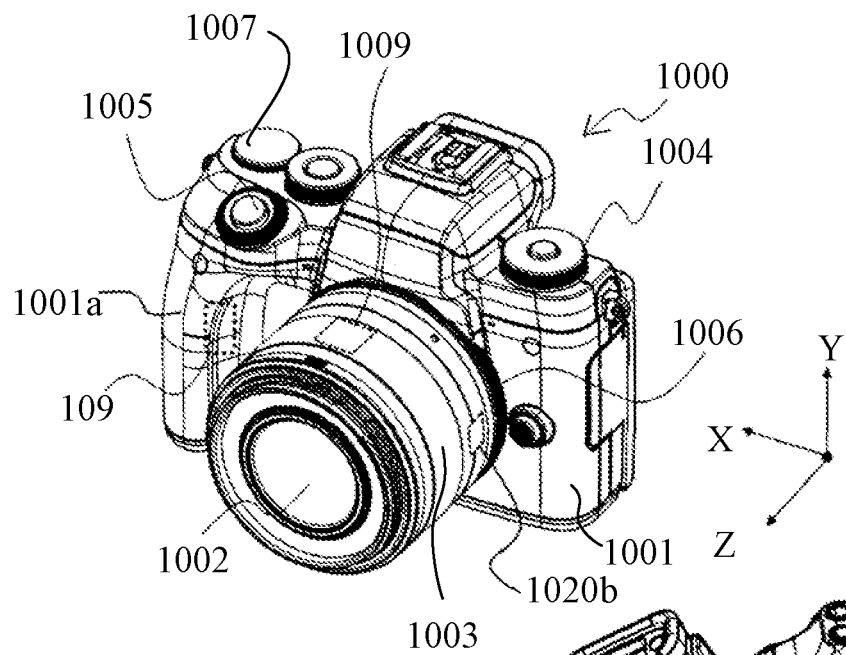
FIGS. 7A to 7C are front and bottom perspective views of a digital camera according to a second embodiment of the present invention, and an exploded perspective view showing an attachment of a camera body and an interchangeable lens.
Figure 7B:
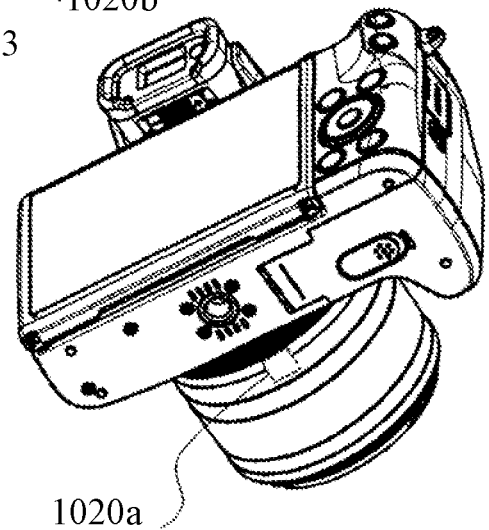
Figure 7C:
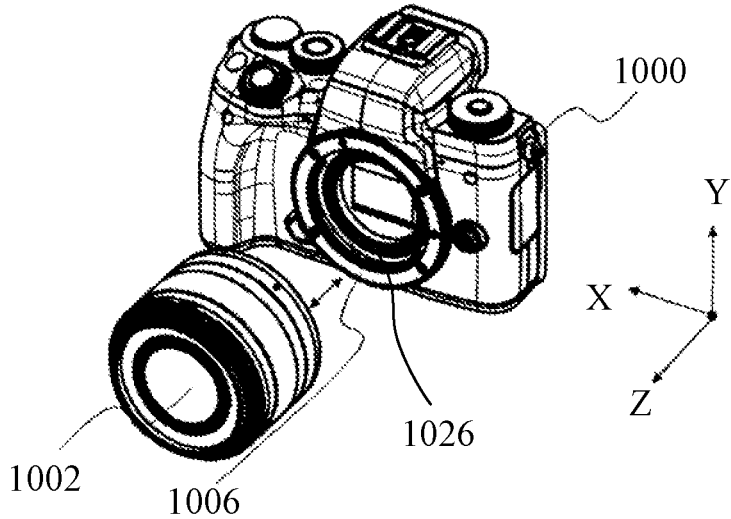

FIG. 7A illustrates the camera 1000 according to this embodiment viewed from the front side, and FIG. 7B illustrates the bottom surface of the camera 1000. Further, FIG. 7C illustrates the camera 1000 and the interchangeable lens 1002 that has not yet been attached to the camera 1000.

A front grip part 1001a is provided on a front surface of a body 1001 of the camera 100 on the left side when viewed from the front side (or right side when viewed from the rear side) so that the user can hold the camera 1000. Further, a mount part 1006 to/from which the interchangeable lens 1002 can be attached/detached is provided at the center of the front surface of the camera 1000.

A rotational operation ring 1003 that can be rotated by the user around the optical axis of the interchangeable lens 1002 is provided to the outer circumference of the interchangeable lens 1002. The user can assign a function for changing an imaging condition such as a focus position and an exposure value to the rotational operation ring 1003.

Disposed on the top surface of the camera 1000 are a mode dial 1004 that is rotated by the user to switch the imaging mode and a release button 1005 that is pressed by the user who instructs imaging. The user can select various imaging modes by rotating the mode dial 1004. As described in the first embodiment, various imaging modes include a manual still image capturing mode, an automatic still image capturing mode, a motion image capturing mode, and the like.

A camera-side vibration device 109 is attached to the inside of the front grip part 1001a. A lens-side vibration device 1009 is provided to the inside of the interchangeable lens 1002 (inside the rotational operation ring 1003). The camera-side vibration device 109 and the lens-side vibration device 1009 are, for example, a linear actuator (LRA) type vibration device or a piezoelectric element type vibration device, and the vibration parameter such as a vibration intensity (amplitude) and a vibration frequency can be variably set. Specific examples of the camera-side vibration device 109 and the lens-side vibration device 1009 in this embodiment are the same as that of the vibration device 109 described with reference FIG. 1C for the first embodiment.

The camera-side vibration device 109 and the lens-side vibration device 1009 generate vibrations according to a user operation of an operation member (operation unit) such as the rotational operation ring 1003, the mode dial 1004, and the release button 1005. Thereby, the vibration is applied to the front grip part 1001a and the rotational operation ring 1003. The user can arbitrarily set whether to generate the vibration in one or both of the camera side vibration device 109 and the lens side vibration device 1009.

A pitch shake detector 120a and a yaw shake detector 120b are provided as camera-side shake detectors inside the camera 1000. Further, a pitch shake detector 1020a and a yaw shake detector 1020b as lens side shake detectors are provided inside the interchangeable lens 1002. The pitch shake detectors 120a and 1020a and the yaw shake detectors 120b and 1020b respectively detect camera shakes in the pitch/yaw direction. Each shake detector may be configured by an angular velocity sensor using a tuning-fork type vibrator described in FIG. 4B in the first embodiment, or an angular velocity sensor using another vibrator such as a comb tooth type.

Which of the camera-side shake detectors (120a, 120b) and the lens-side shake detectors (1020a, 1020b) should detect the camera shakes is determined by the controller 115 based on the detection states of the camera-side shake detector and the lens-side shake detector.

As illustrated in FIG. 7C, the camera 1000 has an electrical contact group 1026 on its mount part 1006. The camera 100 communicates with the interchangeable lens 1002 mounted on the mount part 1006 via the electrical contact group 1026 and supplies power from the camera 1000 to the interchangeable lens 1002.

Figure 8:
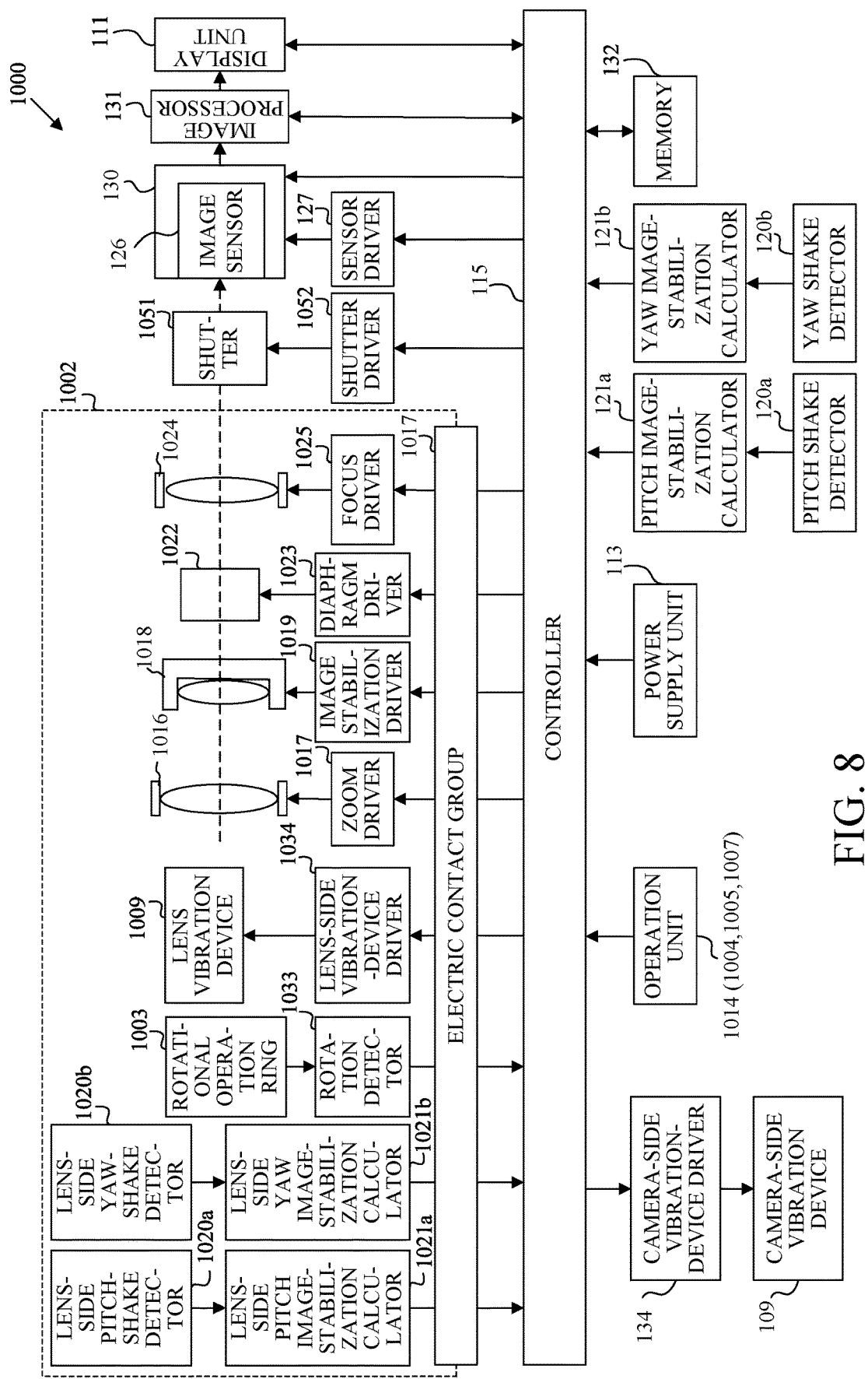
FIG. 8 is a block diagram showing the configuration of the camera according to the second embodiment.

FIG. 8 illustrates the electrical and optical configurations of the camera 1000 and the interchangeable lens 1002 in this embodiment. Those elements of the camera 1000 in the figure, which are corresponding elements in the camera 100 described with reference to FIG. 2 for the first embodiment, will be designated by the same reference numerals and a description thereof will be omitted.

The camera 1000 includes an operation unit 1014 including a power button 1007, a mode dial 1004 and a release button 1005. In this embodiment, the controller 115 controls the entire imaging system including the camera 1000 and the interchangeable lens 1002. At this time, it communicates with the interchangeable lens 1002 via the electrical contact group 1026 described above.

The interchangeable lens 1002 includes a zoom unit 1016 that includes a zoom lens that moves in the optical axis direction for magnification varying, and a lens image-stabilization unit 1018 including a shift lens that moves (shifts) in the X/Y-axis direction orthogonal to the optical axis and reduces (corrects) image blurs. The interchangeable lens 1002 further includes a diaphragm unit 1022 having a light amount adjusting function, and a focus unit 1024 including a focus lens that moves in the optical axis direction for focusing.

The interchangeable lens 1002 further includes a rotation detector 1033 that detects the rotation of the rotational operation ring 1003. When the rotational operation ring 1003 is operated and a magnification varying instruction is input via the rotation detector 1033, the controller 115 controls driving of the zoom unit 1016 via a zoom driver 1017 provided in the interchangeable lens 1002 so as to provide magnification varying.

The controller 115 also controls the diaphragm unit 1022 via a diaphragm driver 1023 provided in the interchangeable lens 1002 according to an F-number setting value received from the operation unit 1014 or a luminance signal obtained from the image processor 131. The controller 115 also controls driving of the focus unit 1024 via a focus driver 1025 provided in the interchangeable lens 1002 in accordance with the focus signal acquired from the image processor 131 for autofocusing.

The interchangeable lens 1002 is provided with a lens-side pitch image-stabilization calculator 1021a and a lens-side yaw image-stabilization calculator 1021b. The lens-side pitch image-stabilization calculator 1021a calculate shift positions in the Y-axis direction of the lens image-stabilization unit 1018 (shift lens) and the sensor image-stabilization unit 130 (image sensor 126) using the shake signal from the lens-side pitch-shake detector 1020a. Further, the lens-side yaw image-stabilization calculator 1021b calculates shift positions in the X-axis direction of the lens image-stabilization unit 1018 and the sensor image-stabilization unit 130 using the shake signal from the lens-side yaw-shake detector 1020b. The interchangeable lens 1002 is provided with an image stabilization driver 1019 that drives the lens image-stabilization unit 1018.

The controller 115 connects the lens-side image stabilization unit 1018 via the image stabilization driver 1019 and the sensor driver 127 in accordance with the lens-side pitch and the shift position in the pitch/yaw direction calculated by the yaw stabilization controllers 1021a and 1021b. The shift position of the sensor image stabilizing unit 130 is controlled. Thereby, the image stabilizing operation for correcting the image blurs is performed.

The pitch image-stabilization calculator 121a and the yaw image-stabilization calculator 121b provided in the camera 1000 calculate the shift positions in the pitch and yaw directions using the shake signals from the camera-side pitch shake detector 120a and the camera-side yaw shake detector 120b. The controller 115 can also control the shift positions of the lens image-stabilization unit 1018 and the sensor image-stabilization unit 130 via the image stabilization driver 1019 and the sensor driver 127 in accordance with the calculated shift positions.

The camera 1000 includes a shutter unit 1051 that performs a shutter operation and a shutter driver 1052 that drives the shutter unit 1051. The controller 115 controls driving of the shutter unit 1051 via the shutter driver 1052 in response to an imaging instruction operation through the release button 1005.

When the rotation detector 1033 detects a rotational operation, the controller 115 causes a lens-side vibration-device driver 1034 to output a driving signal to the lens-side vibration device 1009, and causes the lens-side vibration device 1009 to vibrate. The controller 115 also outputs a driving signal to the camera-side vibration device 109 via a camera-side vibration-device driver 134 to cause the camera-side vibration device 109 to vibrate. As described above, the user can arbitrarily select which of the lens-side vibration device 1009 and the camera-side vibration device 109 to generate vibrations.

The controller 115 can vibrate the camera-side vibration device 109 or the lens-side vibration device 1009 not only in response to a user operation through the rotational operation ring 1003 but also a user operation through the operation unit 114. Even in this case, the user can arbitrarily select which of the camera-side vibration device 109 and the lens-side vibration device 1009 to generate vibrations.

Even in this embodiment, the main vibration generating directions of the lens-side vibration device 1009 and the camera-side vibration device 109 are the optical axis direction (Z direction). That is, they are orthogonal to the vibrator vibrating directions of the pitch shake detector (120a, 1020a) and the yaw shake detector (120b, 1020b), and the shift drive directions (X/Y-axis direction) of the lens image-stabilization unit 1018 and the sensor image-stabilization unit 130. Even in this embodiment, the vibration generated by each vibration device may have the vibration intensity (amplitude) in the main vibration generating direction higher than the vibration intensities in the vibrator vibrating direction and the shift driving direction.

By arranging the vibration devices 109 and 1009 in this way, even if the vibration devices 109 and 1009 vibrate in various vibration patterns, the influence can be minimized on the camera shake detections by the shake detectors (120a, 1020a, 120b, 1020b). Further, the influence can also be minimized on the image stabilization operations of the lens image-stabilization unit 1018 and the sensor image-stabilization unit 130.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention can reduce the influence of vibration generated by the vibration device on the shake detection.

What is claimed is:

1. An optical apparatus configured to correct an image blur by moving an image stabilization unit in a first direction different from an optical axis direction based on shake information obtained by a shake detector, the optical apparatus comprising:
    a vibration device configured to generate a vibration in order to transmit to a user a tactual sense,
    wherein during an imaging and recording period, the vibration device generates the vibration having a vibration intensity in a second direction different from the first direction higher than that in the first direction.

2. The optical apparatus according to claim 1, wherein the vibration device does not generate a vibration in the first direction during the imaging and recording period.

3. The optical apparatus according to claim 1, wherein the vibration device vibrates in the optical axis direction during the imaging and recording period.

4. The optical apparatus according to claim 1, wherein the image stabilization unit includes a lens that forms an imaging optical system or an image sensor that captures an optical image formed by the imaging optical system.

5. The optical apparatus according to claim 1, wherein the vibration device is provided in a grip part of a body of the optical apparatus, and
wherein the shake detector is provided in an area overlapping the grip part viewed in the optical axis direction.

6. The optical apparatus according to claim 1, wherein the first direction is one of directions in which two axes orthogonal to each other extend, and the second direction is a direction orthogonal to the two axes.

7. The optical apparatus according to claim 6, wherein the second direction is the optical axis direction.

8. The optical apparatus according to claim 6, wherein the shake detector has a vibrator configured to vibrate in a third direction, and detects a shake in the first direction applied to the vibrator, and
wherein the vibration device generates the vibration so that the vibration intensity in the second direction is higher than that in the third direction.

9. The optical apparatus according to claim 1, wherein a driving state for moving the image stabilization unit and a non-driving state are switchable,
wherein the vibration device is switchable between a driving state capable of generating the vibration and a non-driving state, and
wherein when imaging is performed while the image stabilization unit is in the non-driving state and the vibration device is in the driving state, the image stabilization unit is controlled to be switched to the driving state.

10. The optical apparatus according to claim 9, wherein the image stabilization unit includes a first image stabilization unit for moving an optical element for forming an object image, and a second image stabilization unit for moving an image sensor configured to capture the object image, and
wherein when imaging is performed while the image stabilization unit is in the non-driving state and the vibration device is in the driving state, one of the first and second image stabilization units which has a smaller power consumption is switched to the driving state.

11. The optical apparatus according to claim 1, wherein the vibration device is attached to a body of the optical apparatus via an elastic member that absorbs the vibration in the first direction.

12. The optical apparatus according to claim 1, wherein the vibration device is configured to generate the vibration in order to transmit to the user the tactual sense according to an operation of an operation unit by the user.

13. An optical apparatus configured to correct an image blur by moving an image stabilization unit in a first direction different from an optical axis direction based on shake information obtained by a shake detector, the optical apparatus comprising:
a vibration device configured to generate a vibration in order to transmit to a user a tactual sense according to an operation of an operation unit by the user,
wherein during an imaging and recording period, the vibration device generates the vibration having a vibration intensity in a second direction different from the first direction higher than that in the first direction, and
wherein the vibration device is a linear actuator type or piezoelectric element type vibration device.

14. The optical apparatus according to claim 13, wherein the vibration device can variably set a vibration parameter such as a vibration amplitude and a vibration frequency.

* * * * *